US009881428B2

United States Patent
Barfield, Jr. et al.

(10) Patent No.: US 9,881,428 B2
(45) Date of Patent: Jan. 30, 2018

(54) ANALYSIS OF VEHICLE DATA TO PREDICT COMPONENT FAILURE

(71) Applicant: Verizon Patent and Licensing Inc., Arlington, VA (US)

(72) Inventors: James Ronald Barfield, Jr., Atlanta, GA (US); Stephen Christopher Welch, Atlanta, GA (US); Marc Edmond Barbier, Atlanta, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 228 days.

(21) Appl. No.: 14/447,235

(22) Filed: Jul. 30, 2014

(65) Prior Publication Data

US 2016/0035150 A1  Feb. 4, 2016

(51) Int. Cl.
| | |
|---|---|
| G06F 19/00 | (2011.01) |
| G07C 5/00 | (2006.01) |
| G05B 23/02 | (2006.01) |
| G07C 5/08 | (2006.01) |

(52) U.S. Cl.
CPC ......... *G07C 5/008* (2013.01); *G05B 23/0254* (2013.01); *G07C 5/0841* (2013.01)

(58) Field of Classification Search
CPC .. G07C 5/008; G07C 5/0841; G05B 23/0254; G06F 11/2263; G01M 15/102; G06Q 30/0265
USPC ....... 701/29.3, 32, 33, 300, 29.4, 29.6, 31.4, 701/29; 700/245; 340/438, 10.1; 717/124; 702/183; 705/14.53
See application file for complete search history.

(56) References Cited

U.S. PATENT DOCUMENTS

| | | | | |
|---|---|---|---|---|
| 6,604,033 | B1 * | 8/2003 | Banet ................. | G01M 15/102 701/29.4 |
| 8,914,149 | B2 * | 12/2014 | Safa-Bakhsh .......... | G07C 5/006 700/245 |
| 9,371,099 | B2 * | 6/2016 | Lagassey ............... | G07C 5/008 |
| 2003/0114965 | A1 * | 6/2003 | Fiechter ............. | G06F 11/2263 701/29.3 |
| 2005/0091642 | A1 * | 4/2005 | Miller ................. | G06F 11/3664 717/124 |
| 2005/0096873 | A1 * | 5/2005 | Klein ..................... | G01H 1/006 702/184 |
| 2006/0101402 | A1 * | 5/2006 | Miller ................. | G06F 11/3636 717/124 |
| 2007/0028219 | A1 * | 2/2007 | Miller ................. | G05B 23/021 717/124 |
| 2007/0028220 | A1 * | 2/2007 | Miller ................ | G05B 23/0278 717/124 |
| 2009/0276115 | A1 * | 11/2009 | Chen .............................. | 701/32 |
| 2010/0121609 | A1 * | 5/2010 | Gorinevsky ....... | G05B 23/0281 702/183 |
| 2011/0119231 | A1 * | 5/2011 | Namburu ............... | G06Q 10/06 707/609 |

(Continued)

*Primary Examiner* — Ronnie Mancho

(57) ABSTRACT

Vehicle data may be analyzed to predict potential component failures, diagnostic trouble codes (DTCs), or other mechanical failures relating to the vehicle. In one implementation the vehicle data may be received from a number of vehicles, the vehicle data including DTCs generated by on-board diagnostic (OBD) systems of the vehicles. The vehicle data may be evaluated using a predictive model to output predictions of DTCs that are likely to occur for a particular vehicle.

24 Claims, 12 Drawing Sheets

(56) References Cited

U.S. PATENT DOCUMENTS

| | | | | |
|---|---|---|---|---|
| 2011/0224865 A1* | 9/2011 | Gordon | ............... | G07C 5/0808 |
| | | | | 701/29.6 |
| 2011/0231055 A1* | 9/2011 | Knight | ................... | G07C 5/008 |
| | | | | 701/31.4 |
| 2011/0258044 A1* | 10/2011 | Kargupta | ............... | G06Q 10/08 |
| | | | | 705/14.49 |
| 2012/0277949 A1* | 11/2012 | Ghimire | ................ | G07C 5/008 |
| | | | | 701/31.4 |
| 2014/0213238 A1* | 7/2014 | Giraud | ................... | G07C 5/008 |
| | | | | 455/418 |
| 2014/0277902 A1* | 9/2014 | Koch | ..................... | G07C 5/008 |
| | | | | 701/29.1 |
| 2014/0277910 A1* | 9/2014 | Suh | ......................... | B60C 23/02 |
| | | | | 701/31.4 |
| 2014/0278074 A1* | 9/2014 | Annapureddy | .... | G01C 21/3453 |
| | | | | 701/468 |
| 2014/0279707 A1* | 9/2014 | Joshua | ............... | G06Q 30/0283 |
| | | | | 705/400 |
| 2015/0039397 A1* | 2/2015 | Fuchs | ................ | G06Q 30/0283 |
| | | | | 705/7.35 |
| 2015/0254719 A1* | 9/2015 | Barfield, Jr. | ....... | G06Q 30/0265 |
| | | | | 705/14.53 |

\* cited by examiner

| vehicle operational data 222 | location (e.g., GPS, heading info)<br>diagnostic (e.g., DTCs, engine performance)<br>vehicle sensor data (e.g., speed, RPM, engine load, battery level)<br>vehicle aggression (e.g., stops, starts, turns, acceleration)<br>reliability (e.g., DTC, engine data, breakdowns)<br>environmental (e.g., emissions parameters, MPG)<br>call center (e.g., calls, call duration)<br>network information (e.g., RSSI)<br>raw sensor data |
|---|---|
| vehicle/ user data 224 | vehicle info (e.g., VIN, body type, make, model)<br>crash information<br>recall information<br>user demographics (e.g., age, gender, home location)<br>driver browsing history, social network info |
| vehicle service info 226 | services (e.g., types of services performed)<br>DTCs to service correlation information<br>repair cost<br>vehicle repair history |

Fig. 3

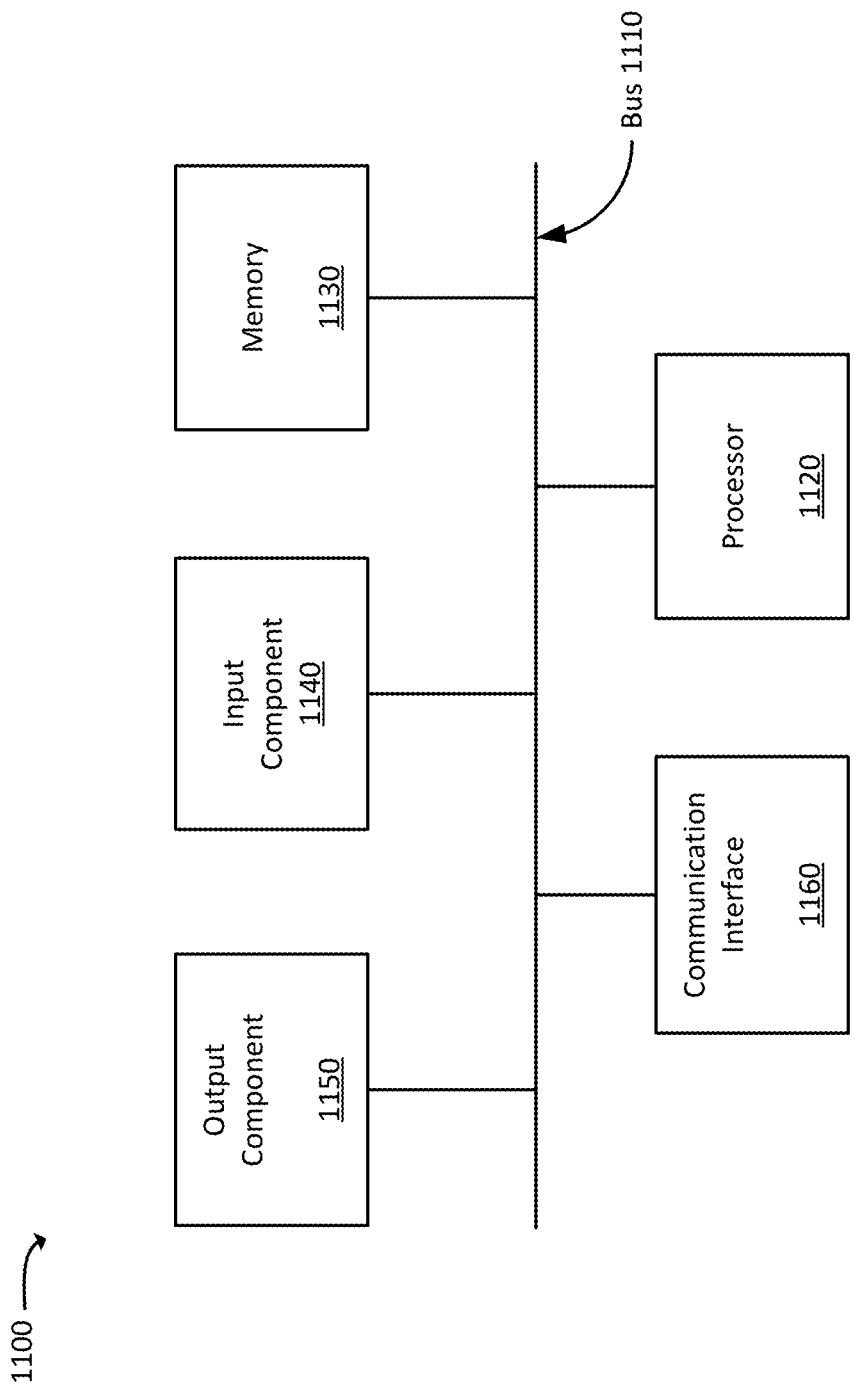

ANALYSIS OF VEHICLE DATA TO PREDICT COMPONENT FAILURE

BACKGROUND

The term "On-Board Diagnostics" (OBD) refers to a computer-based monitoring system built into vehicles. For example, in the United States, model year 1996 and newer light-duty cars and trucks include OBD systems. The OBD system may monitor the performance of some of a vehicle's components. For example, an OBD system may provide vehicle owners with an early warning of malfunctions by way of a dashboard "Check Engine" light.

Vehicle telematics may broadly refer to monitoring of the location, movement, status, diagnostic information, and/or behavior of a vehicle. Some vehicle telematics devices are designed to be inserted into the OBD port of a vehicle. For these telematics devices, power and vehicle diagnostic information may be obtained from the OBD port. The telematics device may additionally include sensors (e.g., a GPS sensor, accelerometer, microphone, or other sensors) to obtain data relating to the operation of the vehicle. The telematics device may additionally include a mechanism to transmit data that is obtained by the telematics device to a remote location, such as a remote analytics or monitoring server.

BRIEF DESCRIPTION OF THE DRAWINGS

FIG. 3 is a diagram illustrating example types of vehicle data that may be collected and used when generating predictive models;

FIG. 11 is a diagram of example components of a device.

DETAILED DESCRIPTION OF PREFERRED EMBODIMENTS

The following detailed description refers to the accompanying drawings. The same reference numbers in different drawings may identify the same or similar elements.

Techniques described herein may provide for the analysis of vehicle data to predict potential component failures or other mechanical failures relating to the vehicle. The vehicle data that is analyzed may include diagnostic information from an OBD port of the vehicle, information available from the vehicle CAN BUS (controller area network bus), data sensed by other sensors associated with the vehicle (e.g., in an onboard telematics device), data relating to drivers of the vehicle, data relating to the particular type of vehicle, data relating to environmental conditions through which the vehicle is driven, and/or other data. In one implementation, unsupervised machine learning techniques and/or supervised machine learning techniques may be used to generate one or more models that may predict failures relating to the vehicle. Reports or alerts may be delivered to an owner, vehicle manufacture, or service representative associated with the vehicle. The reports may included the probability of failure within specific timeframes. In this manner, vehicle owners may be prospectively notified of potential issues relating to the operation of components of the vehicle, allowing the vehicle owners to take mitigating action before component failure. Alternatively, or additionally, vehicle manufactures, car dealerships, or repair service shops can use the reports to notify drivers of potential recalls prior to serious problems occurring or to notify drivers of the subset of the population of vehicles relating to predicted vehicle component failure.

Figure 1A:
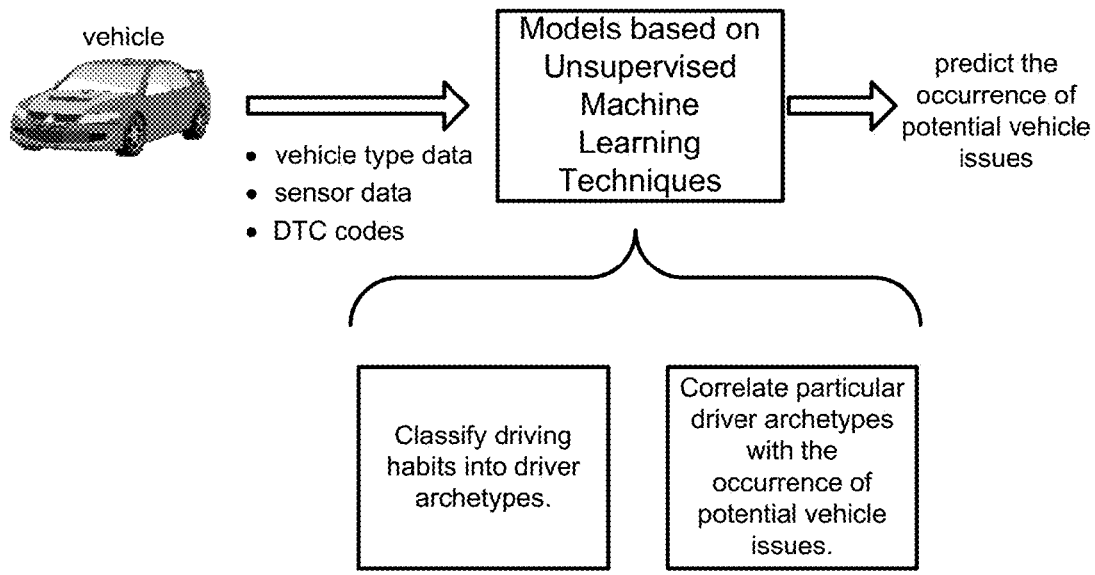
FIGS. 1A and 1B are diagrams illustrating an overview of an example of concepts described herein.
Figure 1B:
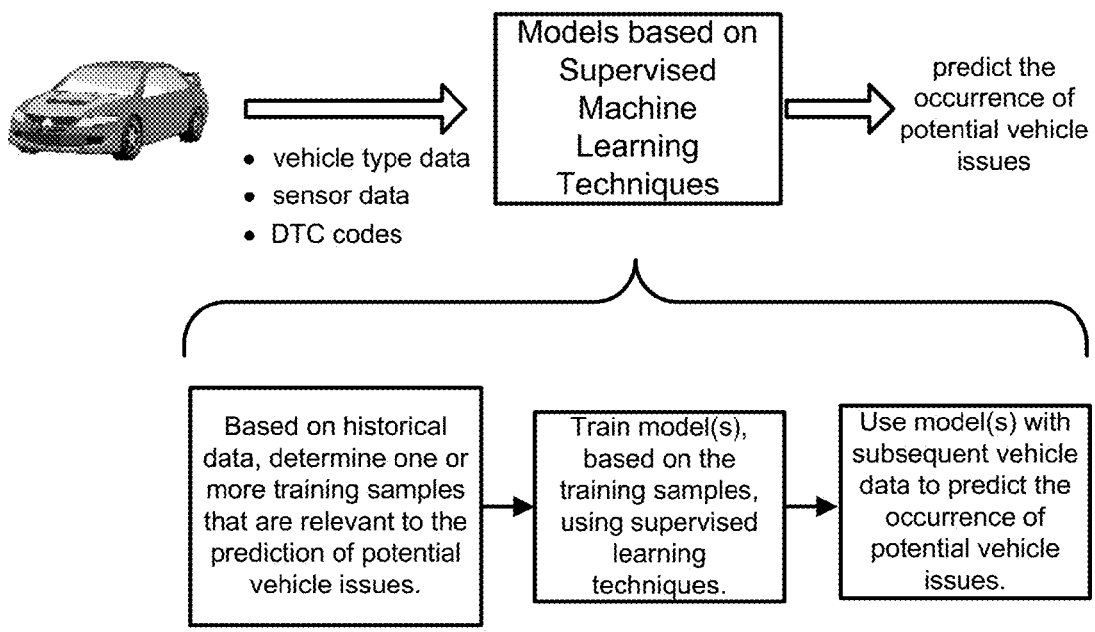

FIGS. 1A and 1B are diagrams illustrating an overview of an example of concepts described herein. FIG. 1A may generally relate to the prediction of potential vehicle issues using unsupervised machine learning techniques, and FIG. 1B may generally relate to the prediction of potential vehicle issues using supervised machine learning techniques. The potential vehicle issues that are predicted may include diagnostic trouble codes (DTCs) that are likely to occur for the vehicle and/or other maintenance issues that are likely to occur for the vehicle.

In the example of FIG. 1A, data may be obtained relating to the operation of a vehicle. As illustrated, the data may include information relating to a particular type of the vehicle ("vehicle type data"), sensor data generated by telematics device in the vehicle ("sensor data"), and DTCs. The DTCs may be codes obtained from the OBD system of the vehicle. For example, the DTC "P2135" may indicate a problem relating to the ability of the throttle to open and close properly.

As is further illustrated in FIG. 1A, the obtained data may be used to generate one or more prediction models based on unsupervised machine learning techniques. Unsupervised machine learning may generally refer to determining hidden structure in unlabeled data. Unlabeled data may refer to data in which there is no error or reward signal on which to train. The generated models may be used to predict future issues (e.g., DTCs or component failures) that are likely to occur for the vehicle. As is further shown in FIG. 1A, a model generated based on unsupervised machine learning may be generated by classifying driving habits into a number of driver archetypes (driver patterns). For example, a vehicle that is consistently driven at a relatively high speed and acceleration may be classified as belonging to an "aggressive" archetype and a vehicle that is driven relatively slowly and with less aggressive acceleration may be classified as belonging to a "not aggressive" archetype. In some implementations, a vehicle may be classified as belonging to multiple archetypes.

Based on analysis of historical data, different driving archetypes may be determined to be correlated with likely vehicle issues. For example, it may be determined that vehicles, of a particular vehicle make and model, that are driven aggressively (e.g., the driving pattern of the vehicle indicates the "aggressive" archetype) may be more likely to experience the DTC "P0710", which may indicate an issue with the automatic transmission fluid temperature sensor, and which may eventually lead to, if not repaired, continual variable transmission (CVT) failure of the vehicle. Accordingly, drivers that are determined to correspond to the "aggressive" archetype may be provided with an alert (e.g., sent to the vehicle or to a mobile phone of the driver) informing the driver of the risk and instructing the driver as to possible mitigating action (e.g., repairs that may be required) to reduce the likelihood of a CVT failure. Unsupervised learning techniques may also be used to classify vehicle wear patters into a number of wear archetypes (e.g. high operating temperature, oil leak). Wear archetypes may then be used alone or in conjunction with driver archetypes to predicted future DTCs.

In the example of FIG. 1B, data relating to a vehicle may be obtained in the manner illustrated in FIG. 1A. The obtained data may be input to one or more prediction models that are determined using supervised machine learning techniques. Supervised machine learning may generally refer to the inferring of a function from labeled training data. The training data may consist of a set of training samples. For example, each training sample may include a number of values (corresponding to features from the vehicle data) and a desired output value (e.g., an indication of whether a component malfunction occurred or a particular DTC was generated).

As illustrated in FIG. 1B, models, generated using supervised machine learning, may predict the occurrence of potential vehicle issues that are likely to occur for the vehicle. As is further shown in FIG. 1B, using supervised machine learning techniques may include determining, based on historical vehicle data, one or more training samples that are relevant to the prediction of DTCs and/or other maintenance issues. The training samples may be used to train one or more models, using supervised learning techniques. The supervised learning techniques may include, for example, support vector machines, linear regression, logistic regression, neural networks, and nearest neighbor methods.

The trained models may be used with subsequent vehicle data to predict DTCs and/or vehicle maintenance issues. For instance, vehicle data, received from a telematics device of a particular make and model of vehicle, may be formatted in the same way that the training samples were formatted to obtain run-time data. The run-time data may then be input to a model that is trained for the particular make and model of the vehicle. The output of the model may be an indication of potential vehicle issues that are likely to be experienced by the vehicle. In some implementations, the output of the model may be an indication of a driver archetype (e.g., a driver classification as "aggressive driver," "passive driver," etc.) or another classification that may then be used as an input to predict potential vehicle maintenance issues. A report or alert may be transmitted to the driver or owner of the vehicle, thus allowing the driver to take mitigating action.

Figure 2:
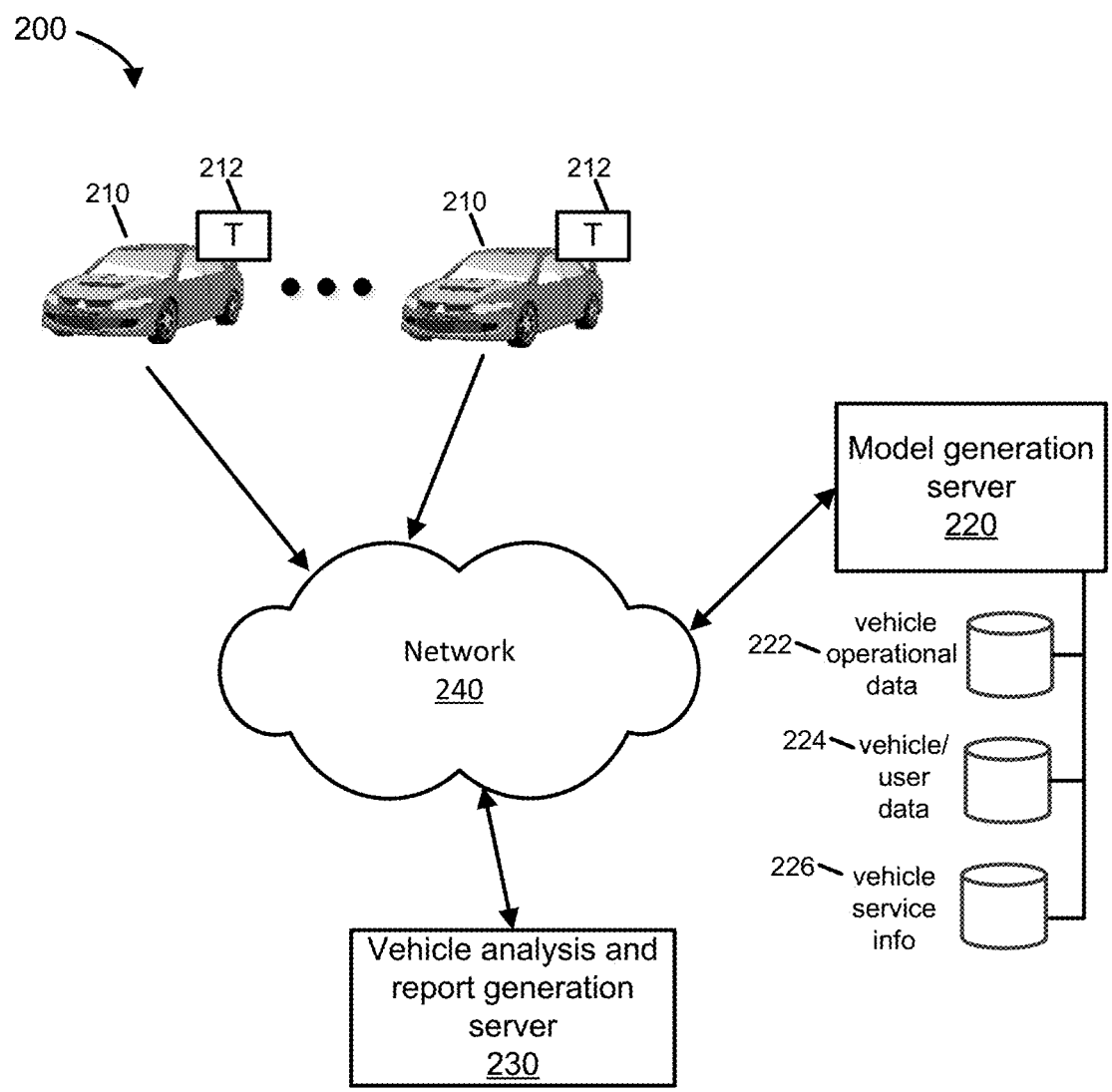
FIG. 2 is a diagram illustrating an example environment in which systems and/or methods described herein may be implemented.

FIG. 2 is a diagram illustrating an example environment 200, in which systems and/or methods described herein may be implemented. As shown in FIG. 2, environment 200 may include one or more vehicles 210, model generation server 220, vehicle analysis and report generation server 230, and network 240. Model generation server 220 and vehicle analysis and report generation server 230, although illustrated as network connected servers in FIG. 2, may alternatively or additionally be implemented by one or more of vehicles 210 or by mobile devices (e.g., smartphones) associated with drivers of vehicles 210.

Vehicles 210 may generally represent any vehicle, such as an automobile, truck, motorcycle, boat (or other water craft), etc. Vehicles 210 may include an OBD system (e.g., an OBD-II system) or other diagnostic system (e.g. CAN BUS) designed to monitor and report information relating to the use and/or operational state of components of vehicle 210. Vehicle 210 may also include telematics device 212, such as an aftermarket telematics device installed via the OBD port of vehicle 210. Telematics device 212 may include a network interface, such as a wired or wireless interface (e.g., a cellular radio, designed to connect to network 220, or a short range wireless radio designed to connect to a smartphone associated with the driver of vehicle 210).

Telematics device 212 may include one or more sensors that may sense data relating to the operation of vehicle 210. The sensors may include, for example, an accelerometer, a location determination device (e.g., a GPS device), a pressure sensor, a microphone, a gyroscope, a camera, or other sensors. Telematics device 212 may transmit vehicle data, from the one or more sensors or vehicle data received via the OBD port, to model generation server 220 and/or to vehicle analysis report generation server 230.

Model generation server 220 may include one or more computing devices, potentially geographically distributed, that receive vehicle data, such as from telematics devices 220 and/or from other sources, and generate one or more models that can be used to predict the occurrence of DTCs, vehicle component failure, and/or other maintenance issues for vehicles 210. Model generation server 220 may generate the models based on vehicle data that may be conceptualized as three types of vehicle data: vehicle operational data 222, vehicle/user data 224, and vehicle service information 226. Vehicle operational data 222 may include data related to the operation of a particular vehicle 210. Vehicle operational data 222 may generally include data that is sensed or otherwise dynamically determined based on the operation of vehicle 210. Vehicle/user data 224 may include information relating to vehicle 210 that is not related to the operation of vehicle 210. Vehicle/user data 224 may include, for example, demographic information relating to the primary driver of vehicle 210, recall information for vehicle 210, crash information for vehicle 210, and/or other information. Vehicle service information 226 may include information about service histories of vehicles. A more detailed description of the types of data associated with operational data 222, vehicle/user data 224, and vehicle service information 226 will be described in more detail below with reference to FIG. 3.

Vehicle analysis and report generation server 230 may include one or more computing devices, potentially geographically distributed, that operate to generate reports and/or alerts associated with vehicles 210. The reports and/or alerts may be generated based on the models determined by model generation server 220. The reports/alerts may be delivered to drivers associated with vehicles 210 or to other users. As part of the generation of the reports/alerts, vehicle analysis and report generation server 230 may receive vehicle data, such as from model generation server 220 and/or directly from vehicles 210.

Network 240 may represent a wireless network (e.g., a wireless cellular network) and/or a wired network through which vehicles 210, telematics devices 212, model generation server 220, and/or vehicle analysis report generation server 230 may communicate. Network 240 may include a wide area network ("WAN"), a metropolitan area network ("MAN"), the Internet, a fiber optic-based network, and/or a combination of these or other types of networks. In one implementation, network 240 may include a wireless network that is implemented based on the Long Term Evolution ("LTE") standard. In other implementations, network 240 may include a wireless network implemented based on other standards, such as a Code Division Multiple Access ("CDMA") 2000 1X network, a second generation ("2G") wireless network, a third generation ("3G") wireless network, a fifth generation ("5G") wireless network, a "Wi-Fi" wireless network (e.g., a network that operates according to an Institute of Electrical and Electronics Engineers ("IEEE") 802.11 standard), and/or another wireless network. In some implementations, network 240 may be communicatively coupled to one or more other networks.

Although FIG. 2 illustrates example components that may be included as part of system 200, in other implementations, the components illustrated in FIG. 2 may contain fewer components, different components, differently arranged components, or additional components than those depicted. Alternatively, or additionally, one or more of the components illustrated in FIG. 2 may perform one or more other tasks described as being performed by one or more other components of FIG. 2.

FIG. 3 is a diagram illustrating example types of vehicle data that may be collected and used, such as by model generation server 220, when generating models used to predict the occurrence of DTCs and/or vehicle maintenance issues. As previously mentioned, vehicle data may generally be categorized as vehicle operational data 222, vehicle/user data 224, and/or vehicle service information 226.

As illustrated, vehicle operational data 222 may include location information, such as the current location of vehicle 210, the heading/direction of vehicle 210, and/or the speed of vehicle 210. The location information may be obtained through GPS techniques, techniques based on translation using cellular towers, and/or other techniques. Vehicle operational data 222 may further include diagnostic information or other information received from a diagnostic system of vehicle 210. The diagnostic information may include DTCs, engine performance information, or other information. In some implementations, the information from the diagnostic system may be received by telematics device 212 and wirelessly transmitted to model generation server 220. Vehicle operational data 222 may further include sensor data, such as readings from an accelerometer, a pressure sensor, a microphone, or other sensors. Vehicle operational data 222 further include information relating to the aggressiveness of the driver of the vehicle. The aggressiveness may be directly measured or may be a derived value, such as a value based on acceleration measurements relating to vehicle stops, starts, turns, or acceleration while driving straight.

Vehicle operational data 222 may further include information relating to reliability (e.g., DTCs, engine data, breakdown data, etc.) and/or environmental data (e.g., emissions information, the number of miles per gallon of fuel (MPG), etc.). Vehicle operational data 222 may further include information relating to calls placed by an operator of vehicle 210, such as emergency calls from vehicle 210. The information relating to the calls may include call duration data, number of calls, and/or other information. The information relating to the calls may be obtained from a call center or emergency support center. Vehicle operational data 222 may further include information relating to the network connectivity of vehicle 210 and/or telematics device 212. The network connectivity information may include, for example, cellular towers to which vehicle 210 is connected, network signal strength data (e.g., received signal strength indicator (RSSI) information), amount of time connected, and/or other information. Vehicle operational data 222 may further include raw sensor data, such as data that is generated by sensors associated with a vehicle 210, such as oxygen flow sensors, fuel sensors, or other sensors. For some vehicles, raw sensor data may be obtainable, by telematics device 212, via the OBD system.

As is further illustrated in FIG. 3, vehicle/user data 224 may include information relating to particular vehicles 210. In contrast to vehicle operational data 222, vehicle/user data 224 may include information that is not associated with ongoing operation of vehicle 210. Vehicle/user data 224 may include information describing vehicle 210, such as the make, model, year, color, body type, etc., of vehicle 210. Vehicle/user data 224 may additionally include crash information relating to vehicle 210, such as information describing collisions in which vehicle 210 was involved, information describing damage that occurred in the collisions (e.g., parts replaced, dollar value of the repairs, etc.), and/or dates of the collisions. Vehicle/user data 224 may additionally include information relating to recalls associated with vehicle 210, and user demographic information associated with the primary driver and/or other drivers of vehicle 210. The demographic information may include, for example, driver age, gender, home location, etc. Vehicle/user data 224 may further include information relating to online activity of the driver, such as web browsing history or social network activity. The information relating to online activity may be gathered with permission of the driver.

As is further illustrated in FIG. 3, vehicle service information 226 may include information about the service history of vehicle 210. Vehicle service information 226 may include the services performed (e.g., oil changes, standard maintenance or inspections, etc.) and the dates of services. Vehicle service information 226 may further include information relating to the occurrence of DTCs and the relation of the DTCs to particular services performed on vehicle 210. For example, for a particular make and model of vehicle, the occurrence of a particular DTC may be correlated with particular services. For example, the occurrence of a particular DTC may be highly correlated with the subsequent replacement of a temperature sensor. Vehicle service information 226 may further include information relating to the average cost of particular services or repairs and vehicle repair history for a particular make and model of vehicle.

The vehicle data described with respect to FIG. 3 represents examples of the types of vehicle data that may be used by model generation server 220 and/or vehicle analysis report generation server 230. Other types of vehicle data, either sensed by vehicle 210, sensed by telematics device 212, or obtained in some other manner (e.g., from an external source), may alternatively or additionally be relevant when generating models based on unsupervised and/or supervised machine learning.

Figure 4:
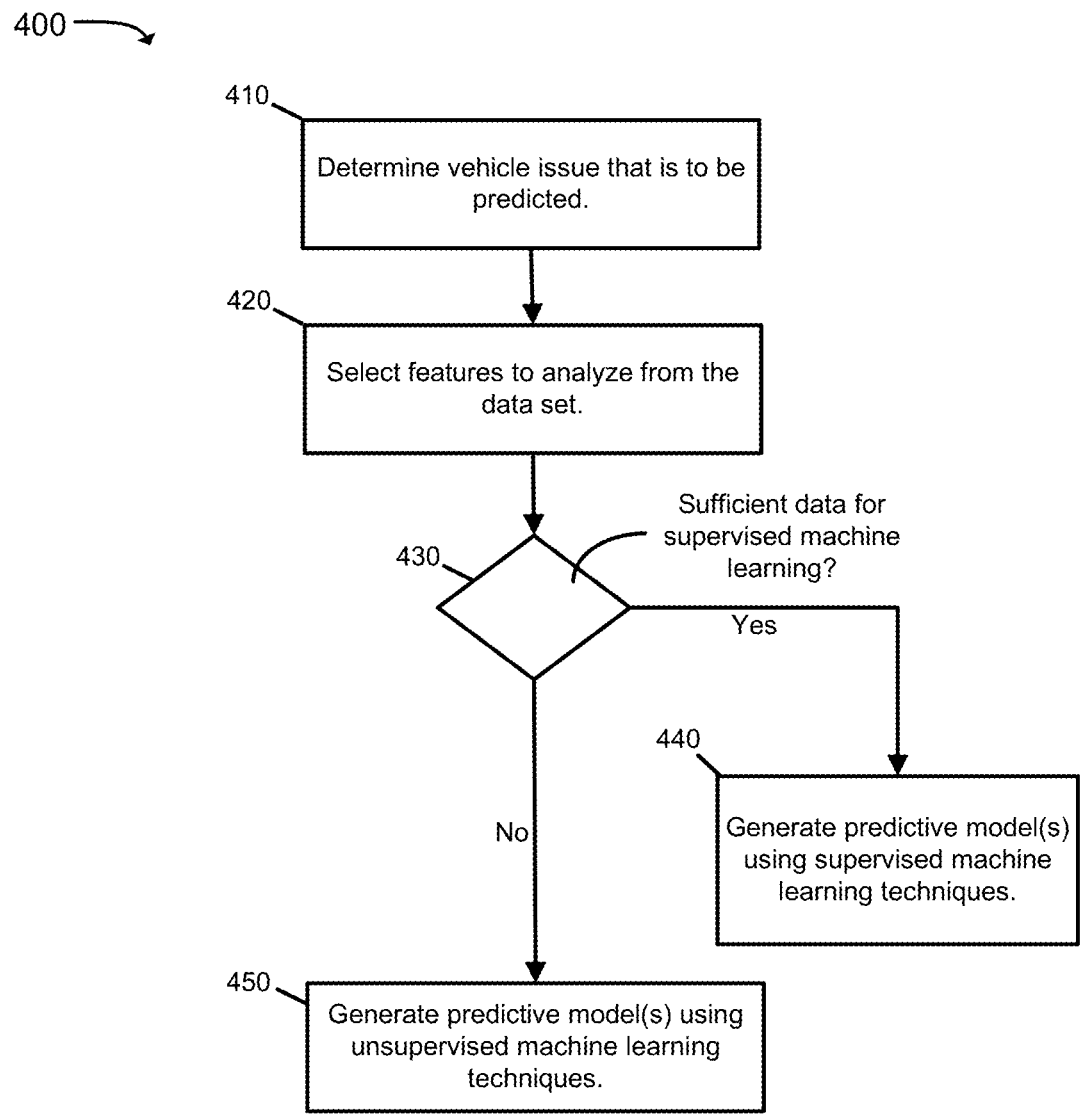
FIG. 4 is a flowchart illustrating an example process relating to the generation of predictive models.

FIG. 4 is a flowchart illustrating an example process 400 relating to the generation of predictive models, to predict the occurrence of vehicle issues, using supervised and/or unsupervised machine learning techniques. Process 400 may be performed by, for example, model generation server 220.

Process 400 may include determining the vehicle issue that is to be predicted (block 410). As previously mentioned, the predictive models may generally relate to predicting future maintenance issues or other issues associated with vehicles 210. In one implementation, the particular maintenance condition, failure condition, DTC, or other issue, that is to be predicted, may be manually determined by a technician. Alternatively or additionally, the particular maintenance condition, failure condition, DTC, or other issue may be determined wholly or partly using automated techniques. For example, vehicle repair history may be analyzed to determine a pattern of unusual or unexpected repairs, for a particular make and model of vehicle. Based on the analysis of the vehicle repair history, it may be determined that it is desirable to predict when and with what probability a particular component associated with the repair is likely to fail.

Process 400 may further include selecting features to analyze from the data set that defines vehicle data (block 420). The selected features to analyze may be selected from vehicle operational data 222, vehicle/user data 224, and/or vehicle service information 226. For example, the selected features may be features associated with the vehicle data discussed with respect to FIG. 3. As examples of features, the feature "RPM (revolutions per minute of a motor) average (for a trip)" and the feature "maximum speed (for a trip)" may be selected as features that may be useful inputs to a model. Additionally or alternatively, features may include signals sampled from sensors or mathematical calculations (e.g. calculations of mean, median, mode, energy, entropy, standard deviation, etc.) from sensor data. For example, the standard deviation of engine RPM may be indicative of the range of driving conditions a vehicle is subjected to, and may be a useful feature in supervised or unsupervised algorithms. Multiple features may be selected, from the data set, to use in training predictive models. One instance of each of the selected features may be referred to as a "sample" herein. For example, for the selected features "RPM average (for a trip)" and "maximum speed (for a trip)," a first sample may correspond to values for the RPM average and the maximum speed of a vehicle over the course of a particular trip. A second sample may correspond to values for the RPM average and the maximum speed of the vehicle (or another vehicle) over the course of another trip.

Process 400 may further include, determining whether sufficient data has been obtained for supervised machine learning (block 430). Supervised machine learning, if attempted with an insufficient number of samples, may result in a predictive model that overfits the data and may thus be unsuitable for real-world predictions. In one implementation, whether sufficient data is available to perform supervised machine learning may be determined based on at least a threshold number of samples being available. The threshold value may be determined based on analysis of the data set, or based on the complexity of the learning model. More complex learning models (with more parameters) may require more training examples to avoid overfitting As an example of a situation in which insufficient data is available for supervised machine learning, consider the situation in which it is desired to predict the future occurrence of a particular DTC. Thousands of samples may be available from the data set, but of the thousands of samples, only four vehicles may have experienced the DTC. In this case, there may be an insufficient number of samples, with respect to the subset of the population that experienced the DTC, to train useful models based on supervised machine learning techniques.

Process 400 may further include, when sufficient data is available (block 430—YES), generating predictive model(s) using supervised machine learning techniques (block 440). In one implementation, uncorrelated features may be used as inputs to the supervised machine learning techniques. The uncorrelated features, with respect to the population and the selected sample of the population, may provide information that may be used to effectively train the predictive models using supervised machine learning techniques. As previously mentioned, the supervised machine learning techniques may include, for example, techniques based on support vector machines, linear regression, logistic regression, neural networks, and nearest neighbor techniques. Generation of the predictive models using supervised machine learning techniques is described in more detail below with reference to the flowchart of FIG. 6.

In some implementations, when deciding whether to use unsupervised machine learning techniques, it may be useful to perform a correlation analysis, on the certain features, with respect to the population and a selected subset of the population that corresponds to the vehicle issue. The correlation analysis may be useful in deciding whether to use supervised machine learning techniques and/or in deciding which features to use as inputs to the supervised machine learning models. The correlation analysis may be performed on the selected features between the subset of the population that experienced the vehicle issue (e.g., a particular DTC) and the remainder of the population (e.g., features corresponding to vehicles in which the particular DTC did not occur). The correlation analysis may be performed manually (e.g., by a technician), automatically, or based on a combination of manual and automated analysis.

Figure 5:
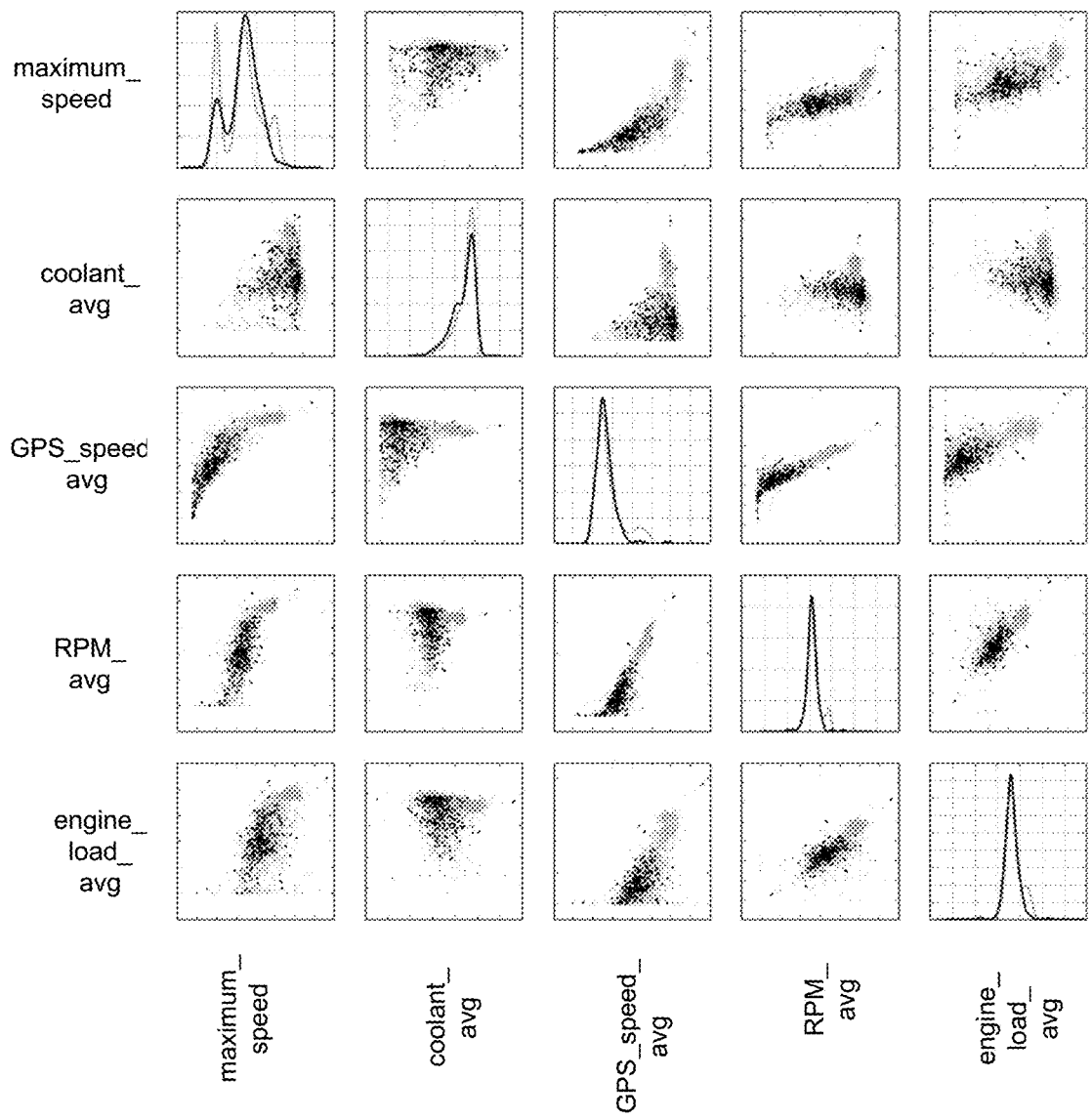
FIG. 5 is a diagram graphically illustrating an example of a correlation analysis applied to a number of features in a data set.

FIG. 5 is a diagram graphically illustrating an example of a correlation analysis applied to a number of features in a data set. In FIG. 5, 25 scatterplots are illustrated, in which each scatterplot graphically illustrates the relationship between multiple pairs of features (selected from five possible features). The five features are: the maximum speed of a vehicle for a trip ("maximum_speed"), the average value for coolant for a trip ("coolant_avg"); the average speed of a vehicle on a trip, as determined by a GPS sensor ("GPS_speed_avg"); the average RPM value of the engine, of a vehicle, on a trip ("RPM_avg"); and the average engine load of the vehicle for a trip ("engine_load_avg"). As an example, the scatterplot in the lower left corner of FIG. 5 compares "engine_load_avg" (vertical axis) versus "maximum_speed" (horizontal axis) and the scatterplot to the right of the scatterplot in the lower left corner compares "engine_load_avg" (vertical axis) to "coolant_avg" (horizontal axis). In FIG. 5, for each plot, darker points may correspond to vehicles that experienced the particular DTC and lighter points may correspond to vehicles that did not experience the particular DTC. As can be seen by visual inspection of the plots, the scatterplot distribution for the darker points and the lighter points are generally correlated, which may indicate that the features being analyzed may not be suitable for supervised machine learning techniques.

Referring back to FIG. 4, when sufficient data is not available for supervised machine learning (block 430—No), process 400 may further include generating predictive models using unsupervised machine learning techniques (block 450). Generation of the predictive models using unsupervised machine learning techniques is described in more detail below with reference to the flowchart of FIG. 7.

In some implementations, instead of generating predictive models using only supervised machine learning techniques, multiple predictive models, using both supervised and unsupervised machine learning techniques, may be generated.

Figure 6:
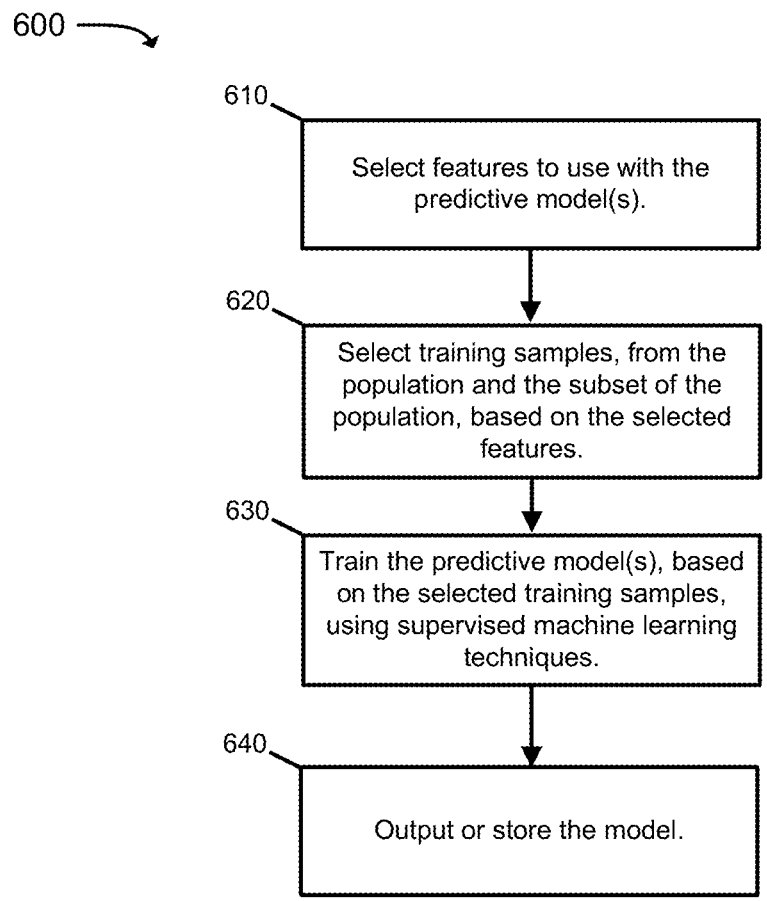
FIG. 6 is a flowchart illustrating an example process relating to the generation of predictive models using supervised machine learning techniques.

FIG. 6 is a flowchart illustrating an example process 600 relating to the generation of predictive models using supervised machine learning techniques. Process 600 may correspond to the operations performed for block 460 (FIG. 4). Process 600 may be performed by, for example, model generation server 220.

In the description for process 600, the vehicle issue that is to be predicted will be described as a DTC. For example, a particular DTC, when it is emitted by the OBD system of the vehicle, may result in costly repairs. Supervised machine learning techniques may be used to determine vehicles that are likely to experience the DTC.

Process 600 may include selecting features that are to be used with the predictive models (block 610). The features may correspond to features, from the data set of vehicle data, that are generally uncorrelated or have low correlation between the population and selected subset of the population. The features used may include derived values, such as a determination of whether a driver is "aggressive" or "passive," or values that are directly measured (e.g., RPM, speed, etc.). In one implementation, "low correlation" may be defined based on a predetermined threshold (e.g., features having a correlation value below 0.5 may be selected). The particular features to use may generally be determined as features that tend to generate accurate predictive models.

Process 600 may further include selecting training samples, from the population and the subset of the population (block 620). Each training sample may include values for each of the selected features. For instance, a number of samples (e.g., feature vectors) may be selected as training samples. The samples to designate as training samples may be randomly selected from the population (including the subset of the population) or selected from the population using some other technique. Some of the selected samples may thus correspond to vehicles that experienced the DTC that is being predicted.

Process 600 may further include training the predictive models, based on the selected training samples, using supervised machine learning techniques (block 630). In this example, the predictive models may be models that are designed to predict the occurrence of the DTC. Training the predictive models may include generating the models using the selected training samples as inputs to a supervised machine learning technique (e.g., support vector machines, linear regression, logistic regression, neural networks, nearest neighbor methods, etc.). In some implementations, the trained predictive model(s) may be tested using testing samples that were not included in the training samples. The results of these tests may be used to determine if a model has overfit the dataset. If a predictive model performs substantially better on the data it was trained on than data it is tested with, the model will likely not generalize well, and may not perform well on new data. Such models may be discarded or retuned and retrained by technicians or by automated process.

Process 600 may further include outputting or storing the predictive models that were trained using the supervised machine learning techniques (block 640). The models may be used, such as by vehicle analysis report generation server 230, to evaluate vehicle data received from vehicles 210. For example, for a predictive model trained to predict the occurrence of a particular DTC, the received vehicle data may be input to the model, which may generate an output indicating whether the particular DTC is likely to occur in the future for the vehicle.

Figure 7:
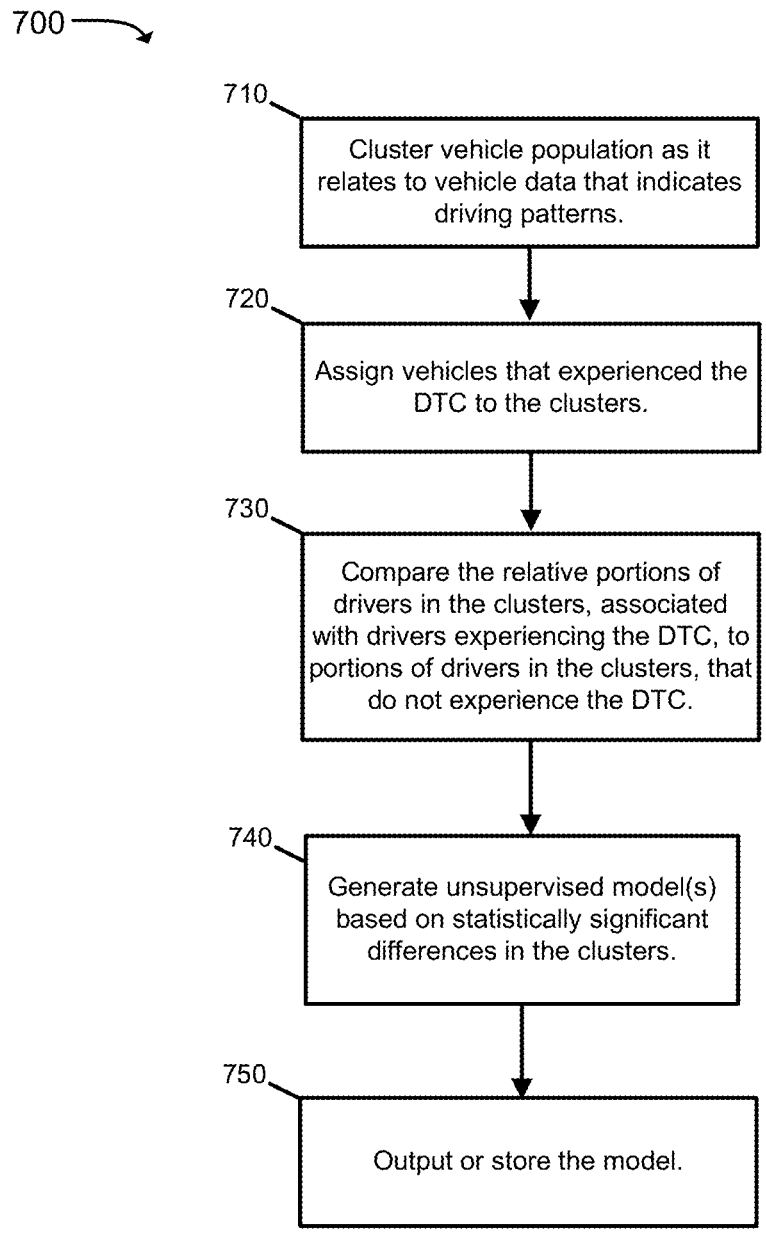
FIG. 7 is a flowchart illustrating an example process relating to the generation of predictive models using unsupervised machine learning techniques.

FIG. 7 is a flowchart illustrating an example process 700 relating to the generation of predictive models using unsupervised machine learning techniques. Process 700 may correspond to the operations performed for block 470 (FIG. 4). Process 700 may be performed by, for example, model generation server 220. As with process 600, process 700 will be described in the context of a predictive model in which the vehicle issue that is to be predicted is a DTC.

Process 700 may include clustering a vehicle population as it relates to vehicle data that indicates driving patterns (block 710). For example, one or more monitored values from the vehicle data, such as the speed of vehicles or the engine RPM of vehicles, may be analyzed by generating histograms indicating the relative frequency with which different vehicles (e.g., the driving patterns of different drivers) are operated with respect to the one or more values. The histograms may be analyzed to determine clusters, such as by using k-means clustering or other clustering techniques. The clusters may be relevant to the occurrence of the DTCs. Conceptually, the clusters may be thought of as corresponding to different classes of drivers (driver archetypes), such as drives that tend to drive aggressively, drivers that tend to drive in city driving conditions, non-aggressive drivers, etc. Clustering analysis may further be used to develop vehicle wear archetypes, climate exposure archetypes, driving condition archetypes (e.g. flat vs. hilly) which may be indicative of future DTCs.

Figure 8:
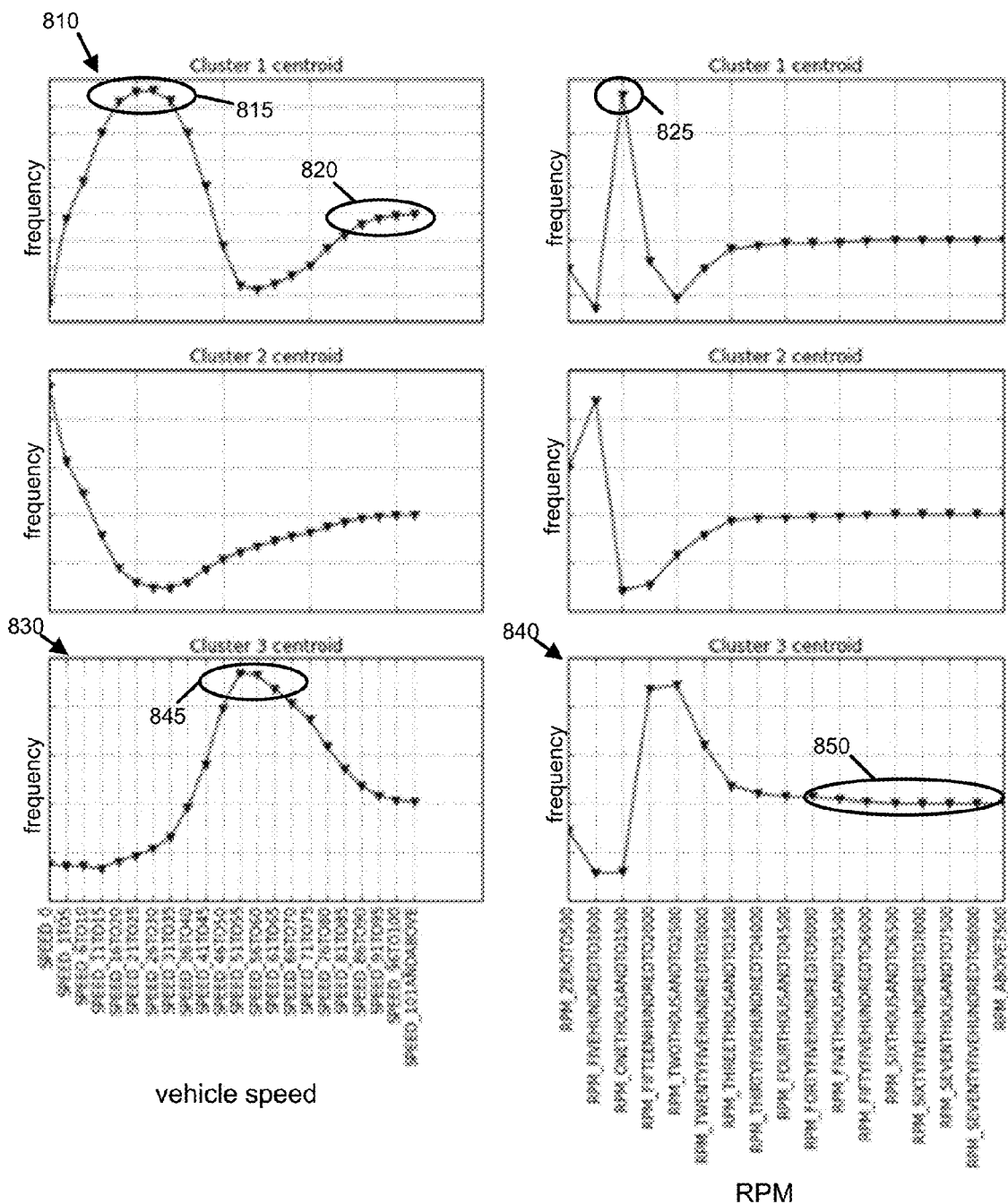
FIG. 8 is a diagram illustrating an example of clustering.

FIG. 8 is a diagram illustrating an example of clustering, in which two measured vehicle values are used to generate the clusters: vehicle speed (plots on the left side of the figure) and engine RPM (plots on the right side of the figure). Each plot may represent a histogram in which points in the histogram correspond to a range of values (e.g., the second point for the vehicle speed histograms correspond to the speed range of zero to five miles per hour (MPH)). The vertical axis in each histogram may correspond to the relative frequency with which vehicles in a particular histogram bin tend to reside. For example, for plot 810 (cluster 1 for speed), drivers in this cluster tend to spend a relatively large amount of time in the 11 to 35 MPH range (section 815). Conceptually, drivers in this cluster may correspond to drivers that tend to mostly drive in cities or towns but that occasionally tend to drive fast (section 820). Similarly, with respect to RPM, drivers in cluster 1 may tend to frequently drive at a speed that generates an RPM range of 1000 to 1500 RPM (section 825). With respect to cluster 3 (plots 830 and 840), drivers in this cluster may tend to frequently drive at relatively high speeds (section 845) and high RPMs (section 850). Drivers in cluster 3 may be conceptually categorized as "aggressive" or "fast" drivers.

Referring back to FIG. 7, process 700 may further include assigning the vehicles that experienced the DTC to the clusters (block 720). For example, for the three clusters that were determined with respect to the example of FIG. 8, assume that for the entire population, approximately 50% of the drivers tend to drive in a driving pattern that fits cluster 1, approximately 25% of the drivers tend to drive in a driving pattern that fits cluster 2, and approximately 25% of the drivers tend to drive in a driving pattern that fits cluster 3. Analyzing the subset of the drivers that experienced the DTC, however, may result in a different relative distribution of the drivers. Similarly, analyzing the subset of the drivers that did not experience the DTC, however, may result in yet another different relative distribution of the drivers.

Figure 9A:
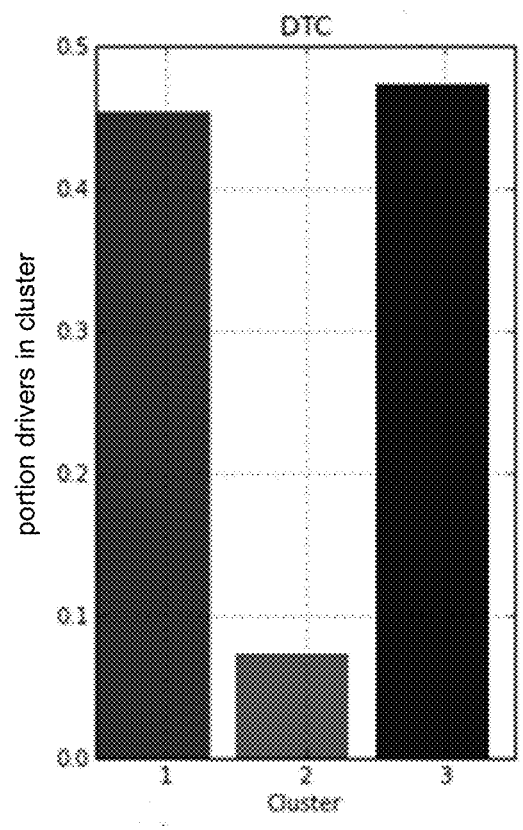
FIGS. 9A and 9B illustrate bar charts relating the assignment of drivers/vehicles to clusters.
Figure 9B:
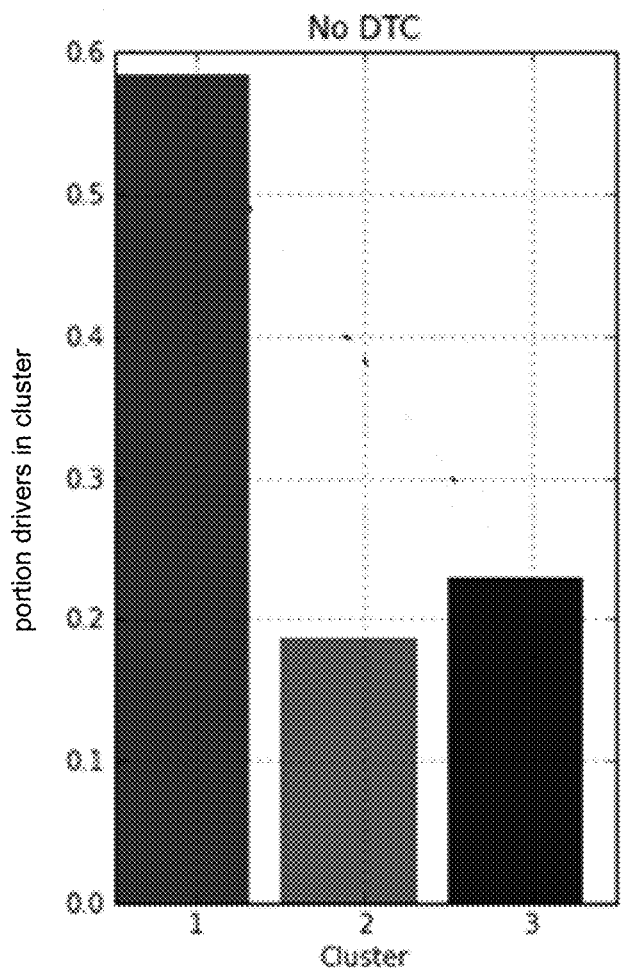

FIGS. 9A and 9B illustrate bar charts relating the assignment of drivers/vehicles to clusters. The charts of FIGS. 9A and 9B may be based on the three example clusters described with respect to FIG. 8. The chart of FIG. 9A may be generated for drivers that experienced the DTC and the chart of FIG. 9B may be generated for drivers that did not experience the DTC. As illustrated, in FIG. 9A, approximately 45% of the drivers tend to drive in a driving pattern that fits cluster 1, approximately 8% of the drivers tend to drive in a driving pattern that fits cluster 2, and approximately 47% of the drivers tend to drive in a driving pattern fits cluster 3. In FIG. 9B, approximately 58% of the drivers tend to driving in a driving pattern that fits cluster 1, approximately 18% of the drivers tend to drive in a driving pattern that fits cluster 2, and approximately 24% of the drivers tend to drive in a driving pattern that fits cluster 3.

Referring back to FIG. 7, process 700 may further include comparing the relative portion of drivers in the clusters, associated with drivers experiencing the DTC, to portions of drivers in the clusters that do not experience the DTC (block 730). The comparison may be performed with the goal of finding statistically significant differences between the clusters generated with respect to drivers experiencing the DTC and not experiencing the DTC. Comparing the bar charts of FIGS. 9A and 9B, for example, it can be seen that drivers that experienced the DTC (FIG. 9A) are more likely to be drivers that drive in a driving pattern that fits cluster 3 relative to drivers that did not experience the DTC (FIG. 9B). In particular, of the drivers that did not experience the DTC, only about 24% of these drivers tend to drive in a driving pattern that fits cluster 3 (FIG. 9B). In contrast, of the drivers that experienced the DTC, about 47% of these drivers tend to drive in driving pattern that fits cluster 3 (FIG. 9A). Drivers that tend to drive in a driving pattern that fits cluster 3 ("aggressive" drivers), but that have not yet had the DTC occur, may be classified as drivers that are at higher risk of occurrence of the DTC.

Process 700 may further include generating unsupervised model(s) based on statistically significant differences in the clusters (block 740). In the example of FIGS. 8, 9A, and 9B, for instance, the model may be generated as a model that receives speed and RPM values for drivers, classifies the drivers into one of three clusters based on the speed and RPM values, and outputs an alert for drivers, for which the DTC has not occurred, but that are classified into cluster 3. In general, model generation server 220 may generate the unsupervised models automatically, or semi-automatically (e.g., with the input of a technician), based on analysis of the vehicle data (e.g., the vehicle data illustrated in FIG. 3).

Process 700 may further include outputting or storing the predictive models that were trained using the unsupervised machine learning techniques (block 750). The models may be used, such as by vehicle analysis report generation server 230, to evaluate vehicle data received from vehicles 210. For example, for a predictive model trained to predict the occurrence of a particular DTC, the received vehicle data may be input to the model, which may generate an output indicating whether the particular DTC is likely to occur in the future for the vehicle.

Figure 10:
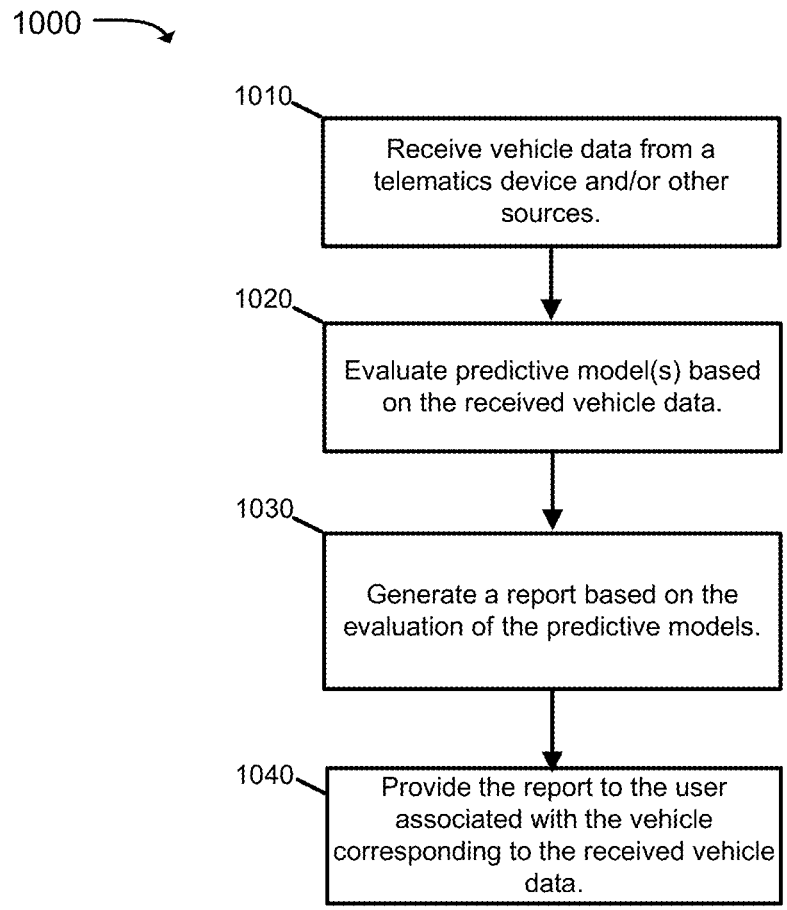
FIG. 10 is a flowchart illustrating an example process relating to the prediction of vehicle issues.

FIG. 10 is a flowchart illustrating an example process 1000 relating to the prediction of vehicle issues, such as a prediction of a DTC or vehicle mechanical issue. Process 1000 may be performed by, for example, vehicle analysis and report generation server 230.

Process 1000 may include receiving vehicle data from telematics devices and/or other sources (block 1010). For example, vehicle analysis and report generation server 230 may receive vehicle data from vehicles 210, telematics devices 212, and/or from model generation server 220. The data that is received by vehicle analysis and report generation server 230 may be data that is required by the previously generated predictive models.

Process 1000 may further include evaluating predictive model(s) based on the received vehicle data (block 1020). The predictive models may include one or more models that were trained based on supervised or unsupervised machine learning techniques, as discussed above. In some implementations, the predictive models may be trained and/or stored based on the make, model, or year of vehicles. Thus, each vehicle make, model, and vehicle year may potentially be associated with different predictive models. Evaluating the predictive model(s) may include formatting or otherwise processing the vehicle data into the format used to train the corresponding predictive models. The predictive models may generate one or more outputs indicating possible issues that may occur with respect to the vehicle corresponding to the received vehicle data.

Process 1000 may further include generating a report based on the evaluation of the predictive models (block 1030). The report may indicate, for example, one or more potential maintenance issues or alerts that may be associated with vehicles 210. In this manner, drivers of vehicles 210 may be prospectively alerted regarding possible maintenance issues, potentially allowing drivers to take mitigating or preventive action before costly repairs are necessary. Additionally, manufactures or other entities may receive the reports, allowing the manufacturers or other entities to monitor potential safety or other design issues with vehicles 210.

Vehicle manufacturers may receive DTC prediction reports and may take actions accordingly. For example, manufactures or other providers of warranties may create maintenance schedules adapted to specific vehicles. Warranty providers may be able to reduce costs by performance maintenance only when required. Accurate DTC prediction may allow warranty providers to avoid both over maintaining vehicles, and repairs resulting from under maintenance. For example, although oil changes may be recommended every 3000 miles, using DTC prediction reports, warranty providers may decrease on increase oil change intervals depending on vehicle use and wear patterns. DTC reports may further be used by vehicle or parts manufacturers to reduce the cost involved in recalling parts or vehicles. For example, potentially defective parts may only affect certain behavior or wear archetypes. Recalls may be issued to only the affected subsets of drivers, potentially significantly reducing the cost of a recall. Further, vehicles may be monitored and recalls may be "rolled out" on an as-needed basis.

Mechanics or car dealerships may receive DTC prediction reports, to prepare parts or technicians for upcoming maintenance, recommend preventative services to customers, or take other appropriate actions. For example, repair shops or dealerships may create maintenance schedules adapted to specific vehicles. Repair shops or dealerships may be able to reduce costs by performance maintenance only when required. Accurate DTC prediction may allow dealerships and repair shops to avoid both over maintaining vehicles, and repairs resulting for under maintenance.

Companies involved in commercial fleet management may make use of DTC reports to lower the cost of maintenance. For example, preventative maintenance may be performed on as case-by-case basis to reduce overall cost and avoid over or under maintenance. Further, drivers exhibiting potentially costly driving behavior may be required or incentivized to modify their behavior. Finally, commercial fleet vehicles may be adaptively cycled between tasks or routes in a way that reduces the overall cost of maintenance.

Process 1000 may further include providing the report to the driver (or other entity, such as the manufacturer, dealership, repair shop, etc.) associated with the vehicle corresponding to the received vehicle data (block 1040). The report may be transmitted, by vehicle analysis and report generation server 230, via network 240. In one implementation, vehicle analysis report generation server 230 may be implemented within or as part of telematics device 212 or vehicle 210. In this situation, the predictive models may be received remotely via network 240 and the report may be provided locally to a driver of vehicle 210.

DTC prediction data may be sold to or used by automobile manufacturers to improve quality control. For example, defective components in specific vehicles that may cause future DTCs may not be common to all vehicles of a specific make, model, and year, as manufacturers may rely on multiple assembly/production plants, or may include new parts in vehicles on a rolling basis. With knowledge of exactly which vehicles exhibit potential DTC, manufactures may be able to reduce costs by preemptively fixing issues at specific plants or with specific parts.

DTC prediction data may be used vehicle sales records by manufacturers or other relevant parties to determine why a customer sold their vehicle. DTC predictions may be used in conjunction with historical vehicle sales and DTC data to determine if a customer is likely to sell their vehicle due to reliability issues. Manufactures may then take steps to pro-actively retain customers who may otherwise switch to another manufacture.

Historical DTC data may be used in conjunction with customer satisfaction scores to determine which DTCs are correlated to low customer satisfaction. With this knowledge, vehicle manufacturers may avoid low customer satisfaction by preemptively handling or mitigating potential issues indicated by DTC predictions. Customer satisfaction may be determined by surveys, direct consumer contact, social media, or other indication. Social media data may be used as a model input in conjunction with historical DTCs to determine connections between customer satisfaction and DTCs. Once relevant connections are established, preemptive steps can be taken based on DTC predictions to retain customers, such as free or reduced cost for vehicle service. Customer demographic data may be used to make further distinctions. For example, only a subset of all customers may be likely to sell their vehicle based on a specific DTC or problem. Manufactures may reduce costs by specifically targeting a subset of customers likely to turnover and likely to experience a specific DTC.

Companies involved in leasing vehicles may use DTC prediction to preemptively replace and service customer's vehicle before an issue occurs, increasing the reliability of the fleet and reducing costs. Finally, manufacturers or other relevant parties may offer specific services using DTC predictions. For example, manufacturers could offer a "virtual inspection" where a user can check the health of their vehicle without visiting a mechanic. Such services may be especially useful to customers before a long trip in their vehicle.

FIG. 11 is a diagram of example components of a device 1100. One or more of the devices described above (e.g., as described with respect to FIGS. 1A, 1B, and 2) may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may include processing circuitry to interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes (LEDs), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared (IR) receiver, a Bluetooth® radio, a Wi-Fi radio, a cellular radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1120 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 4, 6, and 10, the order of the blocks may be modified in other implementations. Further, non-dependent blocks may be performed in parallel. In some implementations, additional blocks may be performed before, after, or in between the described blocks.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving, by one or more computing devices, vehicle data from a plurality of vehicles, the vehicle data including diagnostic trouble codes (DTCs) generated by on-board diagnostic (OBD) computer systems of the plurality of vehicles;
   classifying, by the one or more computing devices, a driver associated with a particular one of the plurality of vehicles to obtain a driver archetype, of a plurality of possible driver archetypes, the driver archetypes indicating driving patterns of drivers;
   evaluating, by the one or more computing devices, the vehicle data according to a predictive model, to determine predictions of DTCs that are likely to occur for a particular one of the plurality of vehicles, the evaluation including using an indication of the driver archetype for the driver;
   generating, by the one or more computing devices and based on the determined predictions of the DTCs, a report describing potential maintenance issues for the particular one of the plurality of vehicles; and
   transmitting, by the one or more computing devices, the report to an entity associated with the particular one of the plurality of vehicles.

2. The method of claim 1, wherein the vehicle data additionally includes:
   sensor data generated by telematics devices associated with the plurality of vehicles;
   information describing vehicle specific information of the plurality of vehicles; or
   information describing repairs performed on the plurality of vehicles.

3. The method of claim 2, wherein the vehicle specific information includes one or more of:
   a vehicle type of the plurality of vehicles;
   engine types associated with the plurality of vehicles; or
   recall information associated with vehicle types of the plurality of vehicles.

4. The method of claim 1, the method further comprising:
   generating the predictive model, based on the vehicle data, using supervised machine learning techniques or unsupervised machine learning techniques.

5. The method of claim 4, further comprising:
   generating the predictive model using the supervised machine learning techniques when a number of available examples of the vehicle data for vehicles that have experienced the determined predictions of DTCs is above a threshold; and
   generating the predictive model using the unsupervised machine learning techniques when the number of available examples of the vehicle data for the vehicles that have experienced the determined predictions of DTCs is below the threshold.

6. The method of claim 1, further comprising:
   clustering the vehicle data, to obtain the plurality of driver archetypes, relating to driving patterns of the drivers of the plurality of the vehicles.

7. The method of claim 6, wherein the predictions of the DTCs include an estimate of the probability of a DTC occurring within a specific time period.

8. The method of claim 1, further comprising:
   determining, based on the predictions from the predictive model, one or more components, associated with the particular vehicle, that are likely to fail.

9. The method of claim 8, further comprising:
   determining predictions relating to when the one or more components are likely to fail.

10. A computing system comprising:
    a non-transitory computer-readable medium containing program instructions; and
    processing circuitry to execute the program instructions to:
    receive vehicle data from a plurality of vehicles, the vehicle data including diagnostic trouble codes (DTCs) generated by on-board diagnostic (OBD) computer systems of the plurality of vehicles;
    classify a driver associated with a particular one of the plurality of vehicles to obtain a driver archetype, of a plurality of possible driver archetypes, the driver archetypes indicating driving patterns of drivers;
    evaluate the vehicle data according to a predictive model to determine predictions of DTCs that are likely to occur for a particular one of the plurality of vehicles, the evaluation including using an indication of the driver archetype for the driver;
    generate, based on the determined predictions of the DTCs, a report describing potential maintenance issues for the particular one of the plurality of vehicles; and
    transmit the report to an entity associated with the particular one of the plurality of vehicles.

11. The computing system of claim 10, wherein the vehicle data additionally includes:

sensor data generated by telematics devices associated with the plurality of vehicles;
information describing vehicle specific information of the plurality of vehicles; or
information describing repairs performed on the plurality of vehicles.

12. The computing system of claim 10, wherein the processing circuitry is further to:
generate the predictive model, based on the vehicle data, using supervised machine learning techniques or unsupervised machine learning techniques.

13. The computing system of claim 12, wherein the processing circuitry is further to:
generate the predictive model using the supervised machine learning techniques when a number of available examples of the vehicle data for vehicles that have experienced the determined predictions of DTCs is above a threshold; and
generate the predictive model using the unsupervised machine learning techniques when the number of available examples of vehicle data for the vehicles that have experienced the determined predictions of DTCs is below the threshold.

14. The computing system of claim 10, wherein the processing circuitry is further to:
cluster the vehicle data, to obtain the plurality of driver archetypes relating to driving patterns of the drivers of the plurality of the vehicles.

15. The computing system of claim 10, wherein the processing circuitry is further to:
determine, based on the output predictions from the predictive model, one or more components, associated with the particular vehicle, that are likely to fail.

16. A computing system comprising:
a non-transitory computer-readable medium containing program instructions; and
processing circuitry to execute the program instructions to:
receive vehicle data relating to a vehicle, the vehicle data being received from a telematics device associated with the vehicle and the vehicle data including:
diagnostic trouble codes (DTCs) generated by an on-board diagnostic (OBD) computer system, and
data from sensors associated with the vehicle;
input the vehicle data to a predictive model trained to output maintenance issues that are likely to occur for the vehicle, the predictive model operating to classify a vehicle use pattern associated with the vehicle into one of a plurality of patterns and to generate the output maintenance issues based on the vehicle use pattern, the vehicle use pattern corresponding to a particular driving pattern at which the vehicle has been driven; and
transmit an indication of the output of the predictive model, to an entity associated with the vehicle, when the output of the predictive model indicates maintenance issues are likely to occur for the vehicle.

17. The computing system of claim 16, wherein the data from the sensors includes information relating to acceleration of the vehicle, speed of the vehicle, motor revolutions per unit time of the vehicle, engine load of the vehicle, intake air temperature associated with the vehicle.

18. The computing system of claim 16, wherein the data from the sensors includes processed values that are based on the data from the sensors, the processed values including indications of vehicle hard stops, hard turns, or fast accelerations.

19. The computing system of claim 16, wherein the received vehicle data additionally includes:
information describing a vehicle type;
information describing repairs performed on the plurality of vehicles;
information describing vehicle services of the plurality of vehicles; or
information describing vehicle maintenance records of the plurality of vehicles.

20. The computing system of claim 16, wherein the predictive model is generated on a per manufacturer and per model basis of the vehicle.

21. The computing system of claim 16, wherein the predictive model is generated using unsupervised machine learning techniques.

22. The computing system of claim 16, wherein the computing system is implemented as part of the telematics device associated with the vehicle or as part of the vehicle, and wherein the predictive model is received from a remote server via a wireless interface.

23. The method of claim 1, wherein the plurality of possible driver archetypes includes a driver archetype that indicates an aggressive driver that tends to drive at a relatively high speed and with relatively high accelerations.

24. The computing system of claim 10, wherein the plurality of possible driver archetypes includes a driver archetype that indicates an aggressive driver that tends to drive at a relatively high speed and with relatively high accelerations.

* * * * *